(No Model.) 4 Sheets—Sheet 1.

F. L. DOW.
AUTOMATIC CIRCULAR KNITTING MACHINE.

No. 465,842. Patented Dec. 29, 1891.

WITNESSES:
Frank C. Curtis.
N. Davenport

INVENTOR:
Frank L. Dow
by Geo. A. Mosher
atty.

THE NORRIS PETERS CO., PHOTO-LITHO., WASHINGTON, D. C.

(No Model.) 4 Sheets—Sheet 2.
F. L. DOW.
AUTOMATIC CIRCULAR KNITTING MACHINE.
No. 465,842. Patented Dec. 29, 1891.
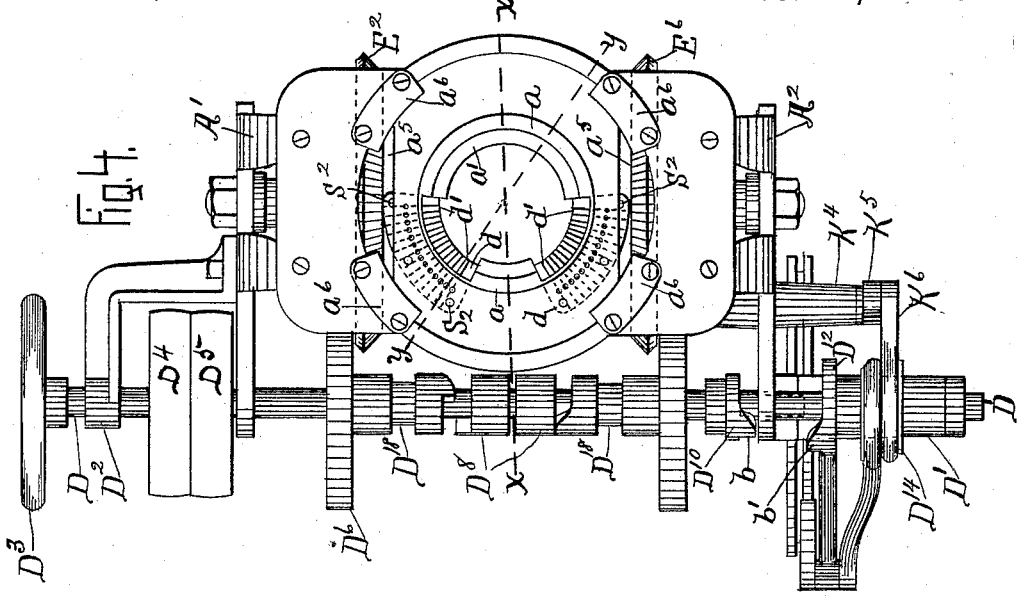
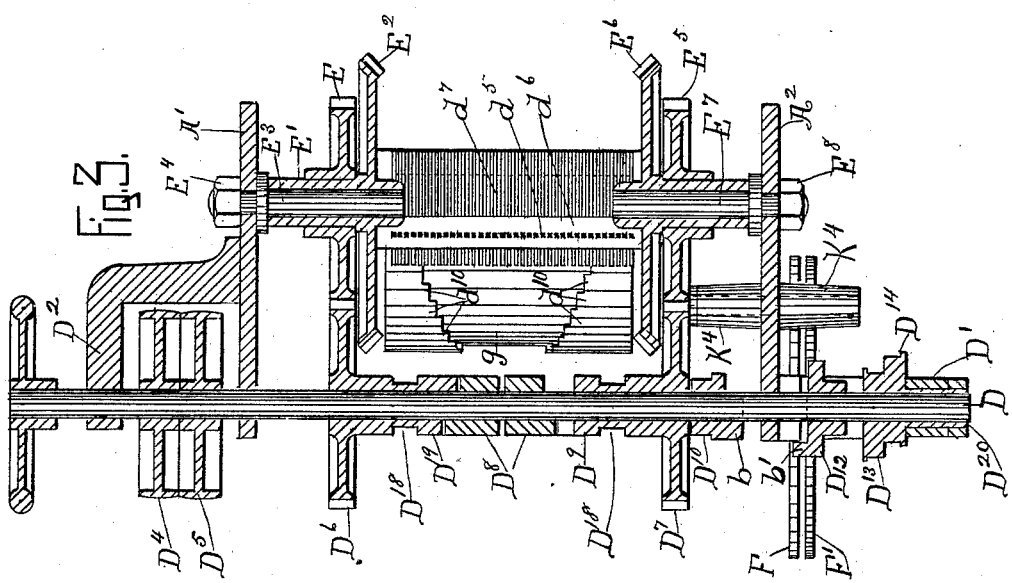
WITNESSES:
Frank C. Curtis.
N. Davenport
INVENTOR:
Frank L. Dow
by Geo. A. ——
atty.

(No Model.) 4 Sheets—Sheet 3.
F. L. DOW.
AUTOMATIC CIRCULAR KNITTING MACHINE.
No. 465,842. Patented Dec. 29, 1891.
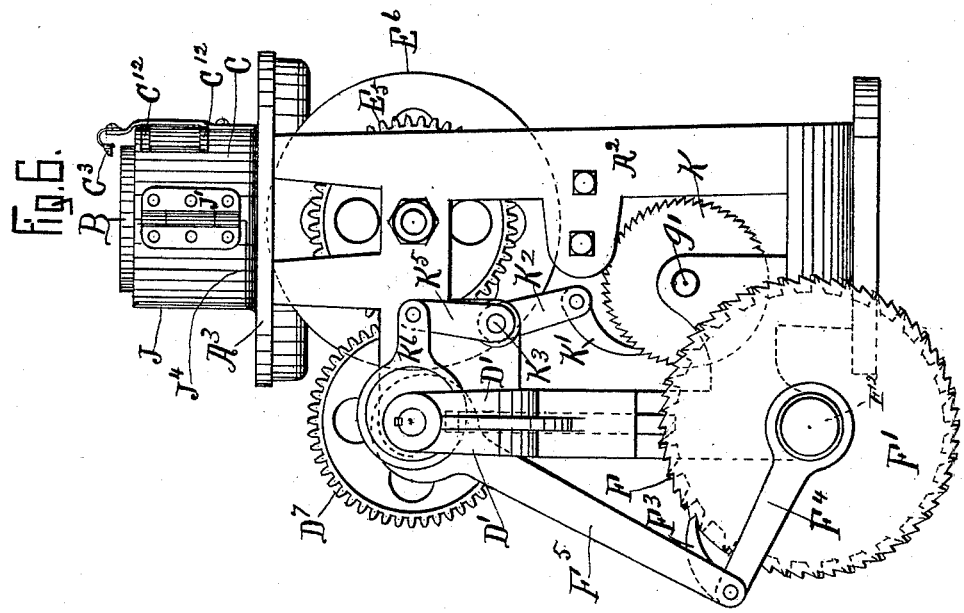
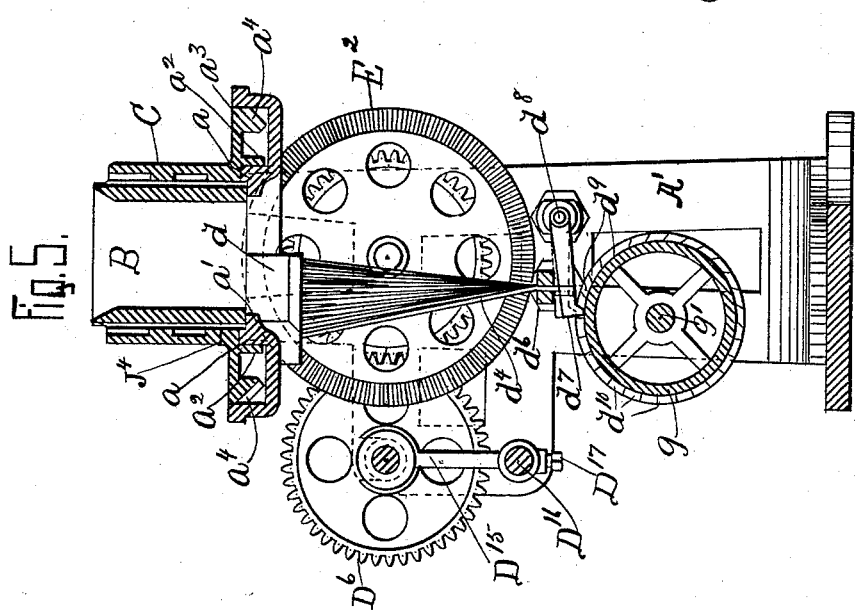
WITNESSES:
Frank C. Curtis
N. Davenport
INVENTOR:
Frank L. Dow
by Geo. A. Mosher
atty.

(No Model.) 4 Sheets—Sheet 4.
F. L. DOW.
AUTOMATIC CIRCULAR KNITTING MACHINE.
No. 465,842. Patented Dec. 29, 1891.
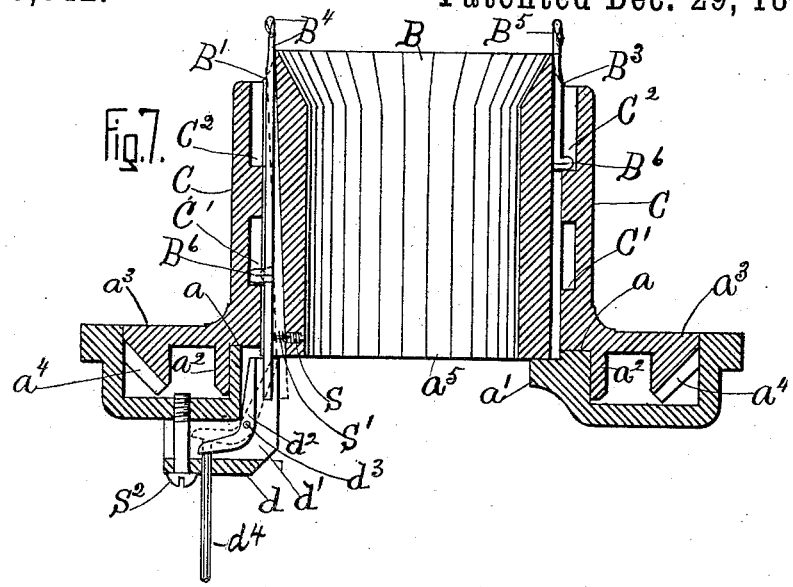
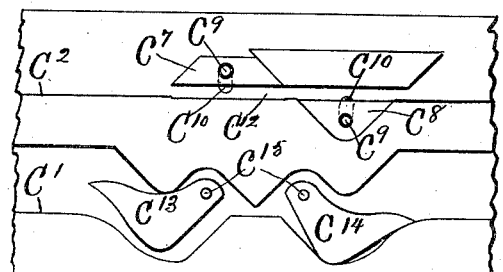
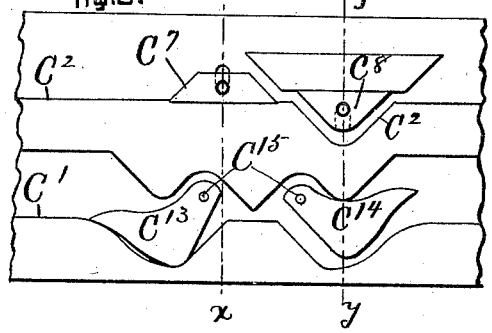
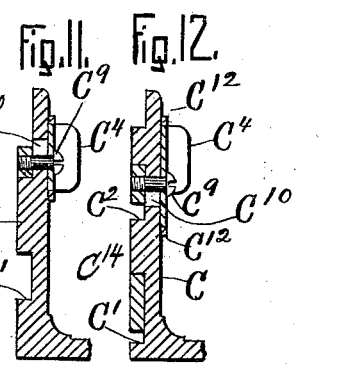
WITNESSES:
Frank C. Curtis
N Davenport
INVENTOR:
Frank L. Dow
by Geo. A. Morse
atty

UNITED STATES PATENT OFFICE.

FRANK L. DOW, OF ROCHESTER, NEW YORK, ASSIGNOR TO THE ROCHESTER HOSIERY COMPANY, OF SAME PLACE.

AUTOMATIC CIRCULAR-KNITTING MACHINE.

SPECIFICATION forming part of Letters Patent No. 465,842, dated December 29, 1891.

Application filed October 7, 1887. Serial No. 251,782. (No model.)

*To all whom it may concern:*

Be it known that I, FRANK L. DOW, a resident of the city of Rochester, in the county of Monroe and State of New York, have invented certain new and useful Improvements in Automatic Circular-Knitting Machines; and I do hereby declare that the following is a full, clear, and exact description of the invention, that will enable others skilled in the art to which it appertains to make and use the same, reference being had to the accompanying drawings, and to the letters of reference marked thereon, which form a part of this specification.

Similar letters refer to similar parts in the several figures therein.

My invention relates to improvements in knitting-machines; and it consists of the novel construction and combination of parts, hereinafter described, and pointed out in the claims, including as a special feature mechanisms for "widening" and "narrowing" in knitting the heels and toes of stockings.

The objects of the invention are fully set forth in connection with the following description.

Figure 1:
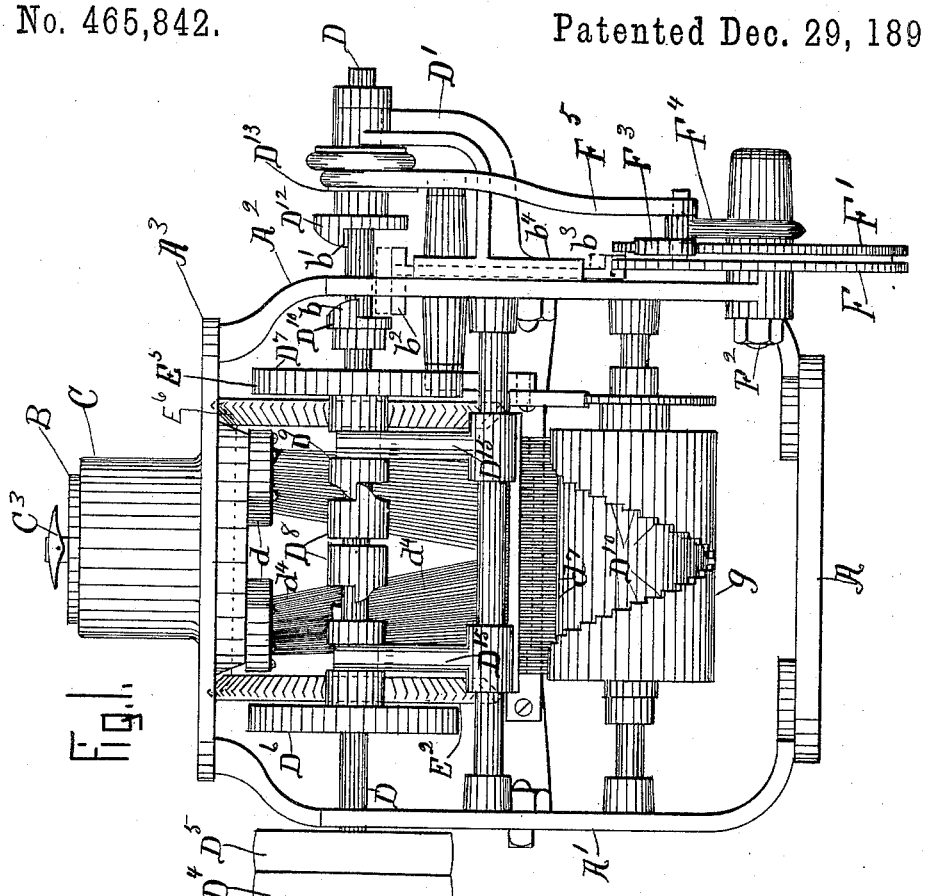
Figure 2:
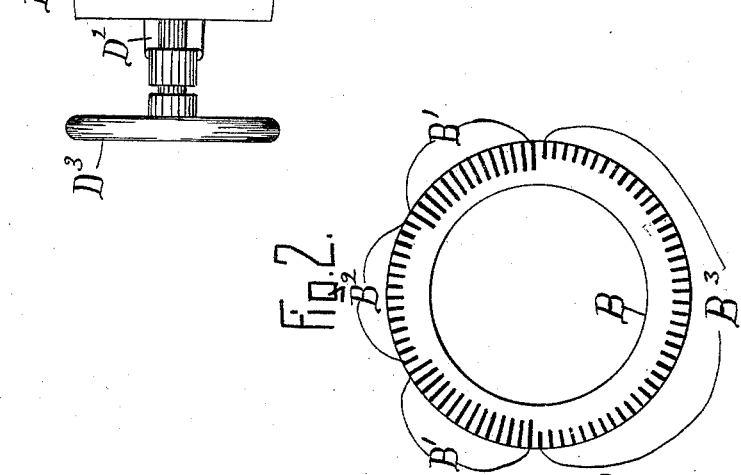

Figure 1 of the drawings is a rear elevation of the machine. Fig. 2 is a bottom plan view of the needle-cylinder detached. Fig. 3 is a horizontal section taken centrally and longitudinally of the shaft D, the shaft being shown in elevation. Fig. 4 is a top plan view of the machine with some of the parts, as the needle and the cam-cylinder, removed. Fig. 5 is a central vertical transverse section of the machine, taken on the broken line $x$ $x$ in Fig. 4. Fig. 6 is an end elevation of the machine. Fig. 7 is a central vertical section of the needle and cam-cylinders, also of the supporting-table, taken at the broken line $y$ $y$ in Fig. 4. Figs. 8 and 9 are elevations of the upper and lower cams in the cam-cylinder for operating the short and long needles and showing the switches connected therewith. Fig. 10 is a plan view of the cam-setting slide detached and straightened to present a flat surface. Figs. 11 and 12 are transverse sections taken, respectively, at the broken lines $x$ $x$ and $y$ $y$ in Fig. 9.

The bed-plate A of the machine is provided with the uprights A' and A², on the top of which rests the table A³, which supports the needle-cylinder B and the cam-cylinder C. The table is provided with a central annular bearing $a$, in the form of a ring, adapted to support the cam-cylinder revoluble thereon and held in place by the downwardly-projecting annular guide-flange $a^2$. The table is provided with an opening $a^5$, Fig. 7, interiorly of the bearing-ring, to permit of the downward passage of the knitted fabric, and with the interiorly-projecting flange $a'$ just inside the ring $a$, which forms the seat for supporting the needle-cylinder. The cam-cylinder is provided with an outwardly-projecting annular flange $a^3$, provided with gear-teeth $a^4$, adapted to mesh with the teeth in the bevel gear-wheels $E^2$ and $E^6$, which project up through the openings $a^5$ in the table and are revolved thereby in either direction by other power, as will be fully explained hereinafter. The cam-cylinder is held down to its seat by the plates $a^6$, screwed to the table and overlapping the toothed flange shown in Fig. 4 only. The needle-cylinder is provided exteriorly with needle-slots B', B², and B³, individually extended longitudinally of the cylinder and in series around the cylinder at approximately equidistant intervals. These slots are each provided with a needle, only two of which are shown—a long one B⁴ and a short one B⁵, Fig. 7.

As all the long needles are alike and all the short ones also, and as the stitches are formed in the usual well-known manner, it is not deemed necessary to show the needles elsewhere.

The needles are each provided with a shoulder B⁶, which follows its respective cam C' or C² in the cam-cylinder as the latter is revolved about the needle-cylinder in the usual well-known manner to give the needles successively a vertically vibratory movement to take the yarn from the carrier C³, secured to the cam-cylinder or an upright thereon.

The operation of my improved machine in knitting the leg of the stocking is not unlike that of any circular-knitting machine or other machines for knitting stockings. The cam-cylinder is revolved continuously around the needle-cylinder in one direction to the left until the point in the fabric is reached where it is desired to commence the heel. At this point it has been the usual practice heretofore to stop the machine and draw up one-half of the needles on that side of the needle-cylinder opposite the thread-carrier until their shoulders were withdrawn from the influence of their actuating-cams, then continue the revolution of the cam-cylinder half-way round, draw up the next needle on one side of the cylinder contiguous to those already drawn up and revolve the cylinder back one revolution to the right, where it was stopped, and the next needle on the side of the cylinder opposite to the needle first singly drawn up was drawn up and the cylinder revolved forward one revolution, and the next succeeding needle to the right of the first singly-drawn-up needle was drawn up, the cylinder revolved to the right another revolution, and the succeeding needle to the left of the second singly-drawn-up needle drawn up, and so on, the cam-cylinder being reciprocally revolved in opposite directions and the successive needles successively drawn up out of engagement with their actuating-cam until a strip of fabric gradually diminished in width was projected from the cylindrical portion forming the leg sufficiently far to form the heel, after which the needles thus successively drawn up were successively in inverse order restored to engagement with their actuating-cam, the cylinder being given a revolution reciprocally after the restoration of each needle. After all the needles had been restored to action continuous revolutions in one direction were imparted to the cylinder, as in knitting the leg until the operation was repeated in knitting the toe.

When needles are successively removed from action, as above described, or otherwise, in knitting fabric, the process is called "narrowing," and when needles are successively restored or brought into action the process is called "widening."

The entire operation of knitting the heels was comparatively slow and irksome, requiring careful and skilled attention. One of the objects of my invention is to obviate the necessity of drawing up that half of the needles which remains idle during the operation of narrowing and widening. I accomplish this object by operating the needles on one side of the needle-cylinder by a separate cam $C^2$, the operative position of which can be easily and quickly changed from an active to a passive position relatively to the needles, so that a complete revolution of the cam-cylinder would not actuate any of these needles when the cam is in a passive position. As will be seen from an inspection of Figs. 7, 8, and 9, this cam $C^2$ occupies the upper part of the cam-cylinder, while cam $C'$ occupies the lower part. One-half the needles are made shorter than the other half and are actuated by the upper cam. The cam $C^2$ is shown in an active position in Fig. 9 and in a passive position in Fig. 8. The change is effected by means of a slide $C^3$ on the outside of the cam-cylinder, which is provided with a thumb-piece $C^4$, and with two diagonal slots $C^5$ and $C^6$. The slide is connected with the movable parts $C^7$ and $C^8$ in the cam-groove by means of rivets or screws $C^9$, which pass through the diagonal slots and through vertical slots $C^{10}$ in the wall of the cam-cylinder and are secured to the movable parts, as shown. The slide $C^3$ is retained in the same horizontal plane by contiguous guide-flanges $C^{12}$, secured to the cylinder, and a movement of the slide in one direction raises the part $C^7$ from the position shown in Fig. 9 to that shown in Fig. 8, and drops the part $C^8$ from the position shown in Fig. 9 to that shown in Fig. 8. A movement of the slide in the opposite direction restores the movable parts to the position shown in Fig 9. When the movable parts are in the position shown in Fig. 9, the shoulders of the needles pass over the part $C^7$ and beneath the part $C^8$. When in the position shown in Fig. 8, they pass beneath part $C^7$ and over part $C^8$. Half the needles employed are short ones and are actuated by this cam $C^2$. They are the needles which remain idle while the heel is being knitted. It is obvious, therefore, that when that point is reached in the leg of the stocking where it is desired to commence narrowing for the heel this needle-cam will be thrown out of action at once by a single movement of the switch-slide $C^3$, which renders the cam $C^2$ passive.

The position of the respective needles will be readily understood upon inspection of Fig. 2, which is a plan of the bottom of the needle-cylinder, the heavy radial short lines indicating the position of the needle-slots. I have shown eighty-four slots in all; but a greater or less number may be used to accommodate a greater or less number of needles. The forty-two on the lower half (marked $B^3$) contain the short needles $B^5$, which are actuated by cam $C^2$. The next fourteen deep slots on each side (marked $B'$) contain the long needles, which are successively thrown out of and into action in narrowing and widening, as will be more fully explained, and the intermediate fourteen (marked $B^2$) contain the long needles which are continuously employed throughout the entire operation of knitting the stocking.

As a means for reciprocally revolving the cam-cylinder I make use of the rotary shaft D, supported in suitable bearings at each end, formed in the ends of the bracket-arms $D'$ and $D^2$, supported, respectively, by the uprights $A^2$ and $A'$, or projections therefrom and employed to communicate the continuous revoluble movements to the cam-cylinder. The shaft is provided with a hand-wheel $D^3$, fixed thereon; also, with a driving and loose pulley $D^4$ and $D^5$, adapted to be connected with a motor by a belt, and with gear-wheels $D^6$ and and $D^7$, having hubs fitting loosely upon said shaft; also, with clutch-heads $D^8$, fixed upon said shaft and adapted to engage with similar clutch-heads on the hubs $D^9$ of the gear-wheels $D^6$ and $D^7$; also, with cams $D^{10}$ and $D^{12}$, fixed thereon, and with eccentrics $D^{13}$ and $D^{14}$. The shaft is adapted to slide longitudinally in its bearings. The gear-wheels $D^6$ and $D^7$ are prevented from partaking of the longitudinal movements of the shaft by means of the forks $D^{15}$, secured to the shaft $D^{16}$ by set-screws, as $D^{17}$. (Shown in Fig. 5 only.) The forks rest in the grooves $D^{18}$ in the hubs $D^9$. The gear-wheel $D^6$ engages with the gear-wheel E, fixed upon the hub $E'$ of the beveled gear-wheel $E^2$, revoluble on a journal $E^3$, fixed to the upright $A'$, as by nut $E^4$. The gear-wheel $D^7$ engages with the gear-wheel $E^5$, secured to the hub of gear-wheel $E^6$, revoluble on journal $E^7$, secured to upright $A^2$ by nut $E^8$, as appears in Fig. 3.

I have before explained that a revoluble motion may be communicated to the cam-cylinder in either direction through the engagement of the toothed flange $a^3$ thereon with the gear-wheels $E^2$ and $E^6$. The shaft D being rotated continuously in one direction, if it is forced longitudinally to the right, so that the end of its fixed clutch member $D^8$, contiguous to clutch member $D^9$, engages with the latter, as shown in Figs. 1 and 4, the loose gear-wheel $D^7$ becomes active and drives wheels $E^5$ and $E^6$ to revolve the cam-cylinder to the right or in the direction of the hands of a watch, and if the shaft is forced longitudinally in the opposite direction, so that the end of its fixed clutch member contiguous to the clutch member $D^{19}$ engages with the latter, as shown in Fig. 3, the loose gear-wheel $D^6$ becomes active and drives wheels E and $E^2$ to revolve the cam-cylinder in the opposite direction, or to the left, the loose wheel $D^7$ becoming passive on the disengagement of the clutch $D^8$ and $D^9$, from which it is apparent that it is only necessary to communicate a longitudinal reciprocatory movement to the shaft to give the cam-cylinder a reciprocatory revoluble movement. As a means for communicating the movements automatically, I provide the two oppositely-inclined cams $D^{10}$ and $D^{12}$ of different diameters so that the inclined flanges $b$ and $b'$ revolve about the shaft at different distances from the axial line of the shaft. The flanges $b$ $b'$ of the cams engage with the head $b^2$ on the upper end of the bar $b^3$, which is adapted to slide vertically in a slideway $b^4$, fixed upon the frame-work of the machine. The lower end of the slide-bar rides upon the toothed cam-wheel F, which is secured to the ratchet-wheel $F'$. The two wheels are revoluble upon a pivot secured to the frame and are revolved by the pawl $F^3$, carried by the arm $F^4$, turning upon pivot $F^2$, and connected with the eccentric $D^{13}$ by the pitman $F^5$. The throw of the eccentric $D^{13}$ is adapted to revolve the ratchet-wheel one notch at every rotation of the shaft. As will be seen by inspection of Fig. 6, the toothed wheel F has only one-half the number of teeth that the ratchet-wheel has, and that the teeth (shown by dotted lines in Fig. 6) each present an inclined surface toward the slide-bar, so that during one series of alternate periods of rotation of the shaft the slide-bar rests in a space between two teeth, and during the other series of alternate periods of rotation of the shaft the slide-bar rests on top of a tooth. When the bar rests between two teeth, as shown in Fig. 1, its head $b^2$ occupies a position below and without the field of the cam $D^{10}$ and just within the field of the cam $D^{12}$; but when the bar mounts the tops of the teeth in wheel F it is lifted above the field of cam $D^{12}$ and within the field of cam $D^{10}$, as shown by the dotted lines in Fig. 1. It is obvious, therefore, that the head $b^2$ will be given a vertically-reciprocatory movement, which withdraws it from the field of one of the cams and thrusts it into the field of the other at every complete rotation of the shaft D. The shaft is designed to rotate to the left, as viewed from the left end facing the hand-wheel $D^3$. If the head $b^2$ is now forced into the field of cam $D^{10}$ the inclined flange $b$ strikes the contiguous end of the head and causes the shaft to slide longitudinally in its bearings from the position shown in Figs. 1 and 4 and that shown in Fig. 3, and when the head drops again at the next rotation of the shaft it enters the field of the cam $D^{12}$, and its inclined flange $b'$, engaging the contiguous end of the head, forces the shaft longitudinally in the opposite direction to the position shown in Figs. 1 and 4.

As a means for accomplishing the remaining object of my invention and for disengaging a portion of the needles successively from their actuating-cam in narrowing and engaging them again in widening, I make use of a pawl-driven cam or cams to actuate bell-cranks, which severally engage with the needles to be acted upon to automatically effect their engagement and disengagement with their actuating-cam. The needle-slots $B'$ in the cylinder—fourteen on each of the opposite sides—are made deeper at their lower ends, as shown in Figs. 2 and 7, and coiled springs S are provided, attached to the wall of the cylinder and resting on the studs $S'$, said springs serving to press the needles out so that their shoulders will engage with their actuating-cam. The needle projects down a little below the bottom of the supporting-cylinder, as shown in Fig. 7, into a slotted frame $d$, having as many slots $d'$ as there are needles to be acted upon—that is, fourteen (more or less) in each of the two oppositely-located frames. The bearing-ring $a$ is partly cut away to receive the frames, as shown. The frames are secured to the table $A^3$ by means of the screws $S^2$. Each slot in the frame contains a bell-crank $d^2$, pivoted at $d^3$ to the frame. The needles project down into the slots to engage with the upper vertical arms of the bell-cranks, while the lower horizontal arms of the cranks are each engaged by a rod $d^4$, passing through an aperture in the bottom of the frame, a rod for each crank. The rods pass down below the table through small apertures $d^5$ in the guide-plate $d^6$ to the cam-levers or rod-lifters $d^7$, one for each rod, resting upon and supported by these cam-levers, as shown in Fig. 5. The cam-levers are pivoted at one end upon a common rod $d^8$, extending longitudinally of the machine and supported at their other ends by a lifting-cam cylinder $g$, mounted upon an axle $g'$, which has a bearing at each end in the machine-frame. The surface of the lifting-cam cylinder $g$ is provided with a countersunk surface, starting from about the longitudinal center on one side and extending step by step in four directions toward the opposite side of the cylinder and toward its ends, substantially as shown, the opposite side (not shown in Fig. 1) being substantially the same as the side therein shown. While knitting plain circular work, as the leg of a stocking, the cam-levers $d^7$ rest in the countersink, as shown in Fig. 1, and the bell-cranks remain idle, as shown by the solid lines in Fig. 7; but when it is desired to throw the first needle out of engagement with its actuating-cam to commence the narrowing process the cam-cylinder $g$ is rotated one step to the left, as viewed in Fig. 5, which causes the end lever $d^7$ to slide up the first step $d^9$ to the position shown by the dotted lines in Fig. 5, which forces the rod upward to operate its bell-crank and push the first narrowing-needle back into its slot and the needle-shoulder out of its cam-groove, as shown by the dotted lines in Fig. 7. By rotating the cam-cylinder another step to the left the first step on the opposite end of cam-cylinder $g$ lifts the end cam-lever on the other end of the series, which throws the first narrowing-needle on the opposite side of the cylinder out of engagement with its actuating-cam by means of its bell-crank in the manner before explained, and so on, a needle first one side and then on the other being thrown out of engagement as the cam-cylinder $g$ is rotated until the cam has been rotated half-way round, when all the cam-levers have been lifted to the higher plane and all the narrowing-needles thrown out of engagement.

It will be observed in Fig. 5 that the steps $d^9$ on the right-hand side of the cylinder are inclined, which permits the cam-levers to slide easily up from the lower to the higher plane, while on the opposite side a vertical ledge is presented as the cam-levers drop by gravity from the higher to the lower plane as the cam is rotated the other half-way round as to release the bell-cranks and permit the coil-springs to force the needles into engagement again with their actuating-cam, which is done successively in the widening process and in the inverse order by rotating the cam $g$ step by step, the same as before described. It should also be observed that the steps on one end of the cam-cylinder $g$ are ranged in positions opposite the spaces between the several steps on the opposite end of the cam-cylinder, so that a cam-lever is raised or lowered first on one end and then on the other end of the series, which throws the needles out of and into engagement in the same order, first one on one side of the needle-cylinder and then one on the opposite side. The steps are preferably so arranged that just after the last needle is thrown out of engagement in the narrowing process the same needle is thrown into engagement in the widening process.

The mechanism for rotating the cam-cylinder $g$ consists of a ratchet-wheel K, fixed upon the shaft $g'$ and adapted to be driven by a pawl K', pivoted to the lever-arm $K^2$, fixed upon one end of a shaft $K^3$, rotary in sleeve $K^4$, fixed upon the machine-frame, the other end of the shaft being provided with a lever-arm $K^5$, connected by link $K^6$ with the eccentric $D^{14}$ upon the driving-shaft D.

It is evident from the foregoing that the ratchet-wheel K will be driven one notch or tooth at each rotation of the driving-shaft. There are as many teeth on the ratchet-wheel as there are steps on the cam-cylinder $g$, including the steps on both ends, so that during the operation of narrowing or widening a needle is either thrown out of or into engagement with its actuating-cam at each rotation of the driving-shaft.

The cam-cylinder $g$ can be stopped at any time by throwing up the pawl K' out of engagement with its ratchet-wheel or put in motion by dropping the pawl upon its wheel while the machine is in motion. The reciprocatory rotary movements of the cam-cylinder previously described can also be controlled in the same manner by throwing up or dropping pawl $F^3$, which engages with ratchet-wheel F'.

The eccentrics $D^{13}$ and $D^{14}$ are made to rotate with the driving-shaft by means of a feather and groove in the shaft and sleeve $D^{20}$, the sleeve permitting the shaft to slide longitudinally therein.

The operation of the machine may be briefly stated as follows: Both the pawls $F^3$ and K' are disengaged from the respective ratchet-wheels and the cam-cylinder $g$ rotated to a position such that the cam-levers $d^7$ are all down upon the lower plane of their actuating-cam. Power is then applied to the driving-shaft, which causes the needle-operating cam-cylinder to revolve continuously in one direction, like any well-known cylinder-machine, until a point is reached where it is desired to commence the operation of narrowing in forming the heel. At this point the two pawls are thrown into engagement with their respective ratchet-wheels and the cam $C^2$ changed to a passive form. The next rotation of the driving-shaft rotates the cam-cylinder $g$ sufficiently to raise the first cam-lever $d^7$ in the series and disengage the first one of the fourteen narrowing and widening needles on one side of the needle-cylinder—for example, the first one on the right in the slots B', as shown in Fig. 2—at the same time the ratchet-wheel F is rotated one notch, which lifts the slide-bar and head $b^2$ into the field of an engaging-cam, which reciprocates the shaft D and gives the cam-cylinder C a reciprocating movement. The next rotation of the driving-shaft disengages the needle in the first slot B' on the left-hand side of the needle-cylinder as viewed in Fig. 2 and again reverses the rotary movements of the cam-cylinder C, and so on until the fourteen needles on each side in slots B' have been thrown out of engagement, and just after the last one is thrown out of engagement the one last thrown out of engagement is thrown in again, and successively all the others, one at each rotation of the driving-shaft. When the last needle is thrown into engagement, the pawls are both disengaged and the cam $C^2$ changed to its active form, whereupon the forty-two needles in slots $B^3$, which have been out of action during the operation of narrowing and widening, again become active and the work goes on the same as when knitting the leg. The needles in the slots $B^2$ remain in action during the whole operation, being actuated by cam C', which may be of any known form to actuate the needles while traveling in either direction.

I have shown two parts $C^{13}$ and $C^{14}$ pivoted to the shell of the cylinder at $C^{15}$. The position assumed by the parts when the needle-shanks pass through, as from right to left, is shown in Fig. 8, and the position assumed when passing in the opposite direction is shown in Fig. 9.

Having described my invention, I do not claim simply and broadly narrowing and widening needles operated automatically by the machine, nor do I claim, broadly, two sets of needles, one long and the other short, and operated by separate cams, as I am aware that such have been used in striped work.

What I claim as new, and desire to secure by Letters Patent, is—

1. In a circular-knitting machine, the combination of a needle-cylinder provided with two sets of needles, one set short for doing circular work only, the other long for doing circular work and narrowing and widening, and a cam-cylinder provided with two independent cam-grooves with which said sets of needles respectively connect, the groove operating the short set having changeable switches by which said needles can be stopped while the long ones produce narrowing and widening, as described.

2. In a circular-knitting machine, the combination, with the cam-cylinder for operating the needles provided with a gear at its lower end, of two sets of gearing connected with said cam-cylinder gear on opposite sides thereof, and a longitudinally-shifting driving-shaft provided with clutch-heads which engage alternately with clutch-heads of the loosely-running gears on opposite sides, whereby when the shaft is thrown to its extreme position in opposite directions reciprocating motion will be imparted to the cam-cylinder to operate the narrowing and widening needles, as herein shown and described.

3. In a circular-knitting machine, the combination of the needle-actuating cam-cylinder C, provided with the gear $a^4$, the side gears $E^2 E^6$, engaging therewith, the spur-gears $E E^5$, fast with the side gears $E^2 E^6$, the exterior spur-gears $D^6 D^7$, engaging with the gears E $E^5$, the driving-shaft D, passing loosely through the hubs of gears $D^6 D^7$ and capable of reciprocating endwise movement, and the fixed clutch-heads $D^8 D^8$ on the shaft engaging alternately with corresponding clutch-heads on the ends of the hubs of the loose gears $D^6 D^7$, as shown and described, and for the purpose specified.

4. The combination of a driving-shaft capable of reciprocating endwise movement, two cams fixed thereto, of different diameters and facing each other, a vertically-movable bar located between the cams, and the toothed cam-wheel for raising and lowering the bar to bring the cams in alternate contact therewith, as and for the purpose specified.

5. In a circular-knitting machine, the combination of the driving-shaft capable of reciprocating endwise movement, the fixed cams on the shaft of unequal diameters, the vertically-movable bar between the cams, the toothed cam-wheel for operating the bar, the ratchet-wheel connected with the toothed cam-wheel and operating the same, the jointed arms connected with an eccentric on the driving-shaft, and the pawl attached to the pivot of said arms engaging with the ratchet-wheel and operating the same, as described.

6. In a circular-knitting machine, the combination, with the needle-cylinder provided with two sets of needles, one long and the other short, and with the cam-cylinder provided with two separate cam-grooves for operating the same, of a set of springs for throwing the long needles into engagement with their cam-groove, a set of bell-cranks on the opposite side for throwing said needles out of engagement with their cam-groove, a set of rods in contact with the bell-cranks, a set of pivoted fingers on which the lower ends of said rods rest, and a cylinder provided with two sets of steps, forming cams on which the free ends of the fingers rest, as herein shown and described.

In testimony whereof I have hereunto set my hand this 24th day of September, 1887.

FRANK L. DOW.

Witnesses:
GEO. A. MOSHER,
CHAS. L. ALDEN.